3,395,113
POLYMERIC COMPOSITIONS
Riyad R. Irani and Robert S. Mitchell, St. Louis, Mo., assignors to Monsanto Company, St. Louis, Mo., a corporation of Delaware
No Drawing. Filed Mar. 29, 1966, Ser. No. 538,193
9 Claims. (Cl. 260—45.9)

This invention relates to organic polymeric compositions and, more particularly, provides novel polymeric compositions having increased resistance to burning and a method for rendering polymeric compositions flame retardant.

It is an object of this invention to provide new and useful polymeric compositions.

It is another object of this invention to provide methods for increasing the resistance of organic polymeric compositions to the action of flames and for making them more resistant to burning action in general.

An additional object of this invention is to provide in polymer compositions an organic phosphorus compound having reduced tendency to decompose and/or degrade from the polymer compositions when the polymer system is subjected to elevated temperatures.

Other objects, advantages, and aspects of this invention will become apparent from a reading of the specification and the appended claims.

This invention provides, as new compositions of matter, an organic synthetic polymer (linear or cross-linked) in combination with an anhydride of an organo-amino-polyphosphonic acid as defined herein.

Another aspect of this invention provides, as new compositions of matter, synthetic copolymeric materials prepared using as a comonomer an anhydride of an organo-amino-polyphosphonic acid as defined herein.

A still further aspect of this invention provides a method for reducing the tendency of organic synthetic polymers to burn after a source of burning heat has been removed from the polymeric compositions by incorporating into the organic synthetic polymeric compositions an anhydride of an organo-amino-polyphosphonic acid as defined herein.

The anhydrides of organo-amino-polyphosphonic acids which are added to, blended with, or co-polymerized with the synthetic polymeric materials to accomplish the above stated objects and aspects are disclosed and described as well as methods for preparing the same in co-pending application Serial Number 538,198 of Riyad R. Irani and Robert S. Mitchell entitled "Anhydrides of Organo-Phosphonic Acids," filed this same date Mar. 29, 1966 which is incorporated herein by reference.

The organic phosphorus compounds which are useful in the present invention are anhydrides of organo-amino-polyphosphonic acids having the formula:

$$R_n-N(-\underset{\underset{Y}{|}}{\overset{\overset{X}{|}}{C}}-\overset{O}{\overset{\|}{P}}=(OH)_2)_{3-n}$$

wherein: $n$ is an integer 0 to 1, X and Y are selected from the group consisting of hydrogen and alkyl groups containing from 1 to 6 carbon atoms and R is selected from the group consisting of hydrogen, aliphatic, aryl, alkaryl, aralkyl, alicyclic, and

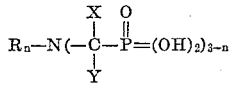

wherein $m$ is an integer from 1 to 10, and $R_1$ and $R_2$ are each selected from the group consisting of hydrogen, alkyl groups containing from 1 to 6 carbon atoms,

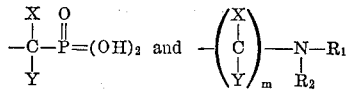

and R does not contain over 6 nitrogen atoms.

As used herein, the term "anhydride(s) of organo-amino-polyphosphonic acid(s)" generically described all of the foregoing. Anhydrides of organo-amino-polyphosphonic acids can be generally characterized by containing at least one anhydride (P—O—P) group per molecule.

In the foregoing general formula, although X and Y are preferably hydrogen, when X and Y represent alkyl groups, the groups may be branched or straight chained and when R represents aliphatic groups, the groups may be branched or straight chained as well as being saturated (alkyl) or unsaturated although it is preferred that if the groups are unsaturated they be ethylenically unsaturated and especially preferred are mono-ethylenically unsaturated (alkenyl) groups. Additionally, when R represents groups containing alkyl moieties, i.e., aralkyl groups and the like, such carbon chains may be of a straight chain srtucture or branched chain structure and it is preferred that such contain from 1 to about 20 carbon atoms. When R represents alicyclic groups such are preferably 5 and 6 membered mono-cyclic alicyclic groups (cyclopentyl and cyclohexyl). When R represents aryl groups or groups containing aryl moieties, i.e., alkaryl groups and the like, such groups are preferably mono-cyclic or dicyclic groups containing from 6 to 10 carbon atoms and especially preferred is the mono-cyclic group containing 6 carbon atoms (phenyl). In addition, the foregoing mentioned hydrocarbyl groups may contain substituent groups, such as, halides (fluoride, chloride, bromide and iodide), alkoxy groups, sulfonyl groups, and the like. Although the hydrocarbyl groups can contain a plurality of such substituent groups it is preferred that they contain only one such substituent group per hydrocarbyl group. For most end use applications the compounds of the instant invention should preferably contain not more than about 25 carbon atoms asociated with R, $R_1$, $R_2$ and X, and there are few, if any, end uses in which these groups contain more than a total of 50 carbon atoms.

In general, the anhydrides of the organo-amino-polyphosphonic acids can be prepared by the process of reacting an organo-amino-polyphosphonic acid (as defined above) with an organic carboxylic anhydride, such as acetic anhydride, at temperatures above about 40° C. and preferably at reflux temperatures for a time sufficient to prepare the desired anhydride product.

Particularly preferred anhydride compounds of the instant invention include the amino tri(lower alkylidenephosphonic anhydrides), that is, anhydrides of amino tri(lower alkylidenephosphonic acids) having the formula:

(II)
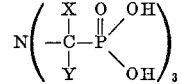

wherein X and Y are selected from the group consisting of hydrogen and alkyl groups containing from 1 to 6 carbon atoms.

A complete or full anhydride of an amino tri(lower alkylidenephosphonic acid) of Formula II above is believed to have the following structure:

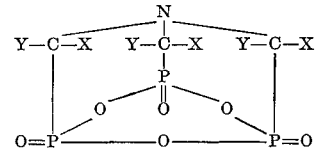

Particularly preferred anhydride compounds of the instant invention include the alkyl amino di(lower alkylidenephosphonic anhydrides), that is, anhydrides of alkyl amino di(lower alkylidenephosphonic acids) having the formula:

(III)
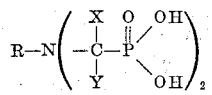

wherein: X and Y are selected from the group consisting of hydrogen and alkyl groups containing from 1 to 6 carbon atoms and R is an alkyl group containing from 1 to 20 carbon atoms.

Particularly preferred anhydride compounds of the instant invention include the alkylene diamine tetra(methylenephosphonic anhydrides), that is, anhydrides of alkylene diamine tetra(methylenephosphonic acids) having the formula:

(IV)
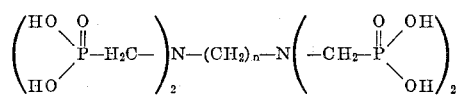

wherein: $n$ is an integer from 1 to 10 inclusive.

The anhydrides of organo-amino-polyphosphonic acids exhibit several unique and/or distinctive properties which include a distinct increase, usually greater than 5° C. and in some cases greater than 50 to 100° C. or more, in the melting point (which may in some instances be a decomposition point) for the anhydride of a particular organo-amino-polyphosphonic acid over the corresponding organo-amino-polyphosphonic acid as well as a rate of reversion to the corresponding organo-amino-polyphosphonic acid of greater than 1 gram per hour when 10 grams of an anhydride of an organo-amino-polyphosphonic acid is slurried in 100 cc. of water for 1 hour at 40° C.

The anhydrides of organo-amino-polyphosphonic acids exhibit an infra-red absorption spectra characteristic of a phosphonic anhydride (Nujol mull, Beckman model IR–4 spectrophotometer). Such spectra includes the anhydirde linkage, P—O—P linkage, as an asymmetric vibration mode at an approximate frequency of 900 to 980 cm.$^{-1}$; for anhydrides containing no

groups, a P=O (free) stretching mode at an approximate frequency of 1250 to 1350 cm.$^{-1}$; and for anhydrides containing

groups, a P=O (hydrogen bonded) stretching mode at approximately 1150 to 1250 cm.$^{-1}$ which is stronger in intensity than a P—OH deformation mode at approximately 930 to 1030 cm.$^{-1}$ as compared to the intensity of a P=O (hydrogen bonded) stretching mode and P—OH deformation mode of the parent organo-amino-polyphosphonic acid. [reference: L. T. Bellamy, "The Infra-Red Spectra of Complex Molecules," John Wiley and Sons, Inc., New York, N.Y., Second Ed., 1959].

Non-limiting examples of anhydride compounds suitable for use in the present invention include anhydrides of the following organo-amino-polyphosphonic acids:

amino tri(methylenephosphonic acid)
dodecyl amino di(methylenephosphonic acid)
pentamethylene diamine tetra(methylenephosphonic acid)
amino tri(ethylidenephosphonic acid)
methyl amino di(methylenephosphonic acid)
decyl amino di(methylenephosphonic acid)
tetradecyl amino di(methylenephosphonic acid)
methyl amino di(butylidenephosphonic acid)
ethylene diamine tetra(methylenephosphonic acid)
ethanol amino di(methylenephosphonic acid)
phenyl amino di(methylenephosphonic acid)
cyclohexyl amino di(methylenephosphonic acid)
cyclopentyl amino di(methylenephosphonic acid)
napthyl amino di(methylenephosphonic acid)
hexylphenyl amino di(methylenephosphonic acid)
dodecylphenyl amino di(methylenephosphonic acid)
phenyloctyl amino di(methylenephosphonic acid)
phenyltetradecyl amino di(methylenephosphonic acid)
phenylethyl amino di(methylenephosphonic acid)
oleyl amino di(methylenephosphonic acid)
trimethylene diamine tetra(methylenephosphonic acid)
hexamethylene diamine tetra(methylenephosphonic acid)
decamethylene diamine tetra(methylenephosphonic acid)
ethylene diamine tri(methylenephosphonic acid)
ethylene triamine penta(methylenephosphonic acid)
triethylene tetraamine hexa(methylenephosphonic acid)

The presently provided anhydrides of organo-amino-polyphosphonic acids are useful as modifiers as well as flame retardants for synthetic polymeric materials. The present anhydrides of organo-amino-polyphosphonic acids may be used in a quantity which is equal to that of the polymer, but in most instances favorable results with respect to improvement in flame-retardance are obtained at concentrations which are definitely lower. In some cases amounts as little as 0.1%, by weight of polyemr and anhydride, may be used, although generally it is preferred that amounts of from about 1% to 50% be used to provide polymeric systems with reduced burning rates. Use of the present anhydrides of organo-amino-polyphosphonic acids with the polymeric materials in quantities which confer beneficial properties to the polymers with respect to a desired effect, i.e., flame retardance, often confers to the polymer an improvement also in such characteristics as resistance to impact, dimensional stability, moldability, dye receptivity and the like. Hence in order to arrive at optimum beneficial effect suited to the purposes for which the polymeric composition is designed, only routine testing, involving variation of adjuvant quantity is generally required, although in some instances one or more members of the whole class of the presently provided anhydrides of organo-amino-polyphosphonic acids will be found to impart a degree of modification at a low concentration which can be attained by other members of the class at significantly higher concentrations.

The flammability test for measuring the burn qualities of polymer samples is for the most part essentially the standard burn test known as ASTM–D1692–D59T or modifications thereof. As used herein a polymeric composition is considered "non-burning" if there is no evidence of burning (flame or progressive glow) after removal of the burner and a "self-extinguishing" sample is one that continues to burn after removal of the burner but the flame goes out before the second gauge line is reached.

In general, the anhydrides of organo-amino-polyphosphonic acid anhydrides can be used as a comonomer in place of or in combination of other conventionally used dibasic or polybasic carboxylic anhydrides, such as phthalic and maleic anhydride, to form synthetic polymeric systems. The anhydrides, for example, can undergo reactions with reactive hydrogen-containing materials, which include polyamines containing at least two amine groups with a reactive hydrogen on each group and polyhydroxyl-containing organic compounds (containing at least two hydroxyl groups with a reactive hydrogen on each group) including polyhydric alcohols, phenols and the like. A distinct advantage of the present invention, therefore, is the flexibility which the phosphonic anhydrides exhibit in formulating and preparing polymeric compositions. For example, they can be used with preformed monomers, copolymers and the like or they can be used as a comonomer to form polymers with other appropriate monomer materials.

In general, the polyhydric alcohols which are useful in preparing polymers by reaction with the phosphonic anhydrides include glycerol, pentaerythritol (including di- and tri-pentaerythritol), sorbitol, mannitol, and the glycols (including the alkenylene glycols and the polyalkylene glycols in which the alkylene group is $(-CH_2-)_n$ wherein $n$ is an integer from 2 to 10), such as, ethylene glycol, propylene glycol, butylene glycol, diethylene glycol, dipropylene glycol, triethylene glycol, tetraethylene glycol, hexamethylene glycol, decamethylene glycol and the like. The reaction for preparing the polymers results in when using a polyhydric alcohol, for example,

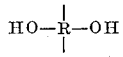

the following:

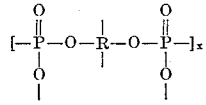

wherein R represents the hydrocarbon (including hydroxy-substituted hydrocarbon) portion of the polyhydric alcohol and $x$ represents a recurring unit of the polymer.

In general, the polyamines which are useful in preparing polymers by reaction with the phosphonic anhydrides include the alkylene polyamines (particularly the alkylene diamine, triamine, and tetraamines in which the alkylene group is $(-CH_2-)_n$ wherein $n$ is an integer from 2 to 10) such as, ethylene diamine, diethylene diamine, hexamethylene diamine, decamethylene diamine, treithylene tetraamine, pentamethylene triamine, hexamethylene tetraamine, butylene diamine, and the like. The reaction for preparing the polymers results in when using a polyamine, for example,

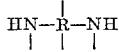

the following:

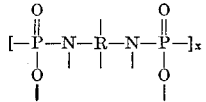

wherein R represents the hydrocarbon (including amine-substituted hydrocarbon) portion of the polyamine and $x$ represents a recurring unit of the polymer.

Usually, all that is necessary is to mix the phosphonic acid and polyamine and/or polyhydric organic compounds preferably in amounts of about one P—O—P (phosphonic anhydride) group per amine or hydroxyl group, although amounts on a phosphonic anhydride group to amine or hydroxyl group ratio of from about 1:10 to 10:1 can be used, and heat to elevated temperatures, such as from about 40° C. to the melting point of the reactants (under atmospheric pressure, although sub-atmospheric pressures as well as pressures in excess of atmospheric can be used) with temperatures above about 90° C. being preferred. In addition, it is sometimes advantageous to employ an inert liquid non-aqueous reaction medium such as paraffin hydrocarbons, benzene, toluene, xylene, acetone, dimethyl formamide and the like and after polymerization removing the medium such as by distillation and/or decantation in order to recover the polymer.

Synthetic polymeric materials, i.e., those high molecular weight organic materials which are not found in nature, with which the present anhydrides of organo amino-polyphosphonic acids are advantageously employed may be either linear or cross-linked polymers and they may be either those which are produced by addition polymerization or by condensation.

An important class of polymers which are beneficially modified according to the invention are those obtained from a polymerizable monomer compound having ethylenic unsaturation.

A particularly preferred class of polymers flameproofed hereby consists of the polymerized vinyl and vinylidene compounds, i.e., those having the $CH_2=C<$ radical. Compounds having such a radical are, e.g., the solid polymeric alkenes, such as polyethylene, polypropylene, polyisobutylene or ethylene-propylene copolymer; polymerized acrylyl and alkacrylyl compounds such as acrylic, chloroacrylic and methacrylic acids, anhydrides, esters, nitriles and amides, for example, acrylonitrile, ethyl or butyl acrylate, methyl or ethyl methacrylate, methoxymethyl or 2-(2-butoxyethoxy)ethyl methacrylate, 2-(cyano-ethoxy) ethyl 3-(3-cyanopropoxy)propyl acrylate or methacrylate, 2-(diethylamino) ethyl or 2-chloroethyl acrylate or methacrylate, acrylic anhydride or methacrylic anhydride; methacrylamide or chloroacrylamide, ethyl or butyl chloroacrylate; the olefinic aldehydes such as acrolein, methacrolein and their acetals; the vinyl and vinylidene halides such as vinyl chloride, vinyl fluoride, vinylidene fluoride and 1-chloro - 1 - fluoroethylene; polyvinyl alcohol; the vinyl carboxylates such as vinyl acetate, vinyl chloroacetate, vinyl propionate, and vinyl 2-ethyl-hexanoate; the N-vinyl imides such as N-vinylphthalimide and N-vinyl-succinimide; the N-vinyllactams such as N-vinyl-caprolactam and N-vinylbutyrolactam; the vinyl aromatic hydrocarbon compounds such as styrene, α-methylstyrene, 2,4-dichlorostyrene, α- or β-vinylnaphthalene, divinylbenzene and vinylfluorene; the vinyl ethers such as ethyl vinyl ether or isobutyl vinyl ether; vinyl-substituted heterocyclic compounds such as vinylpyridine, vinylpyrrolidone, vinylfuran or vinylthiophene; the vinyl or vinylidene ketones such as methyl vinyl ketone or isopropenyl ethyl ketone; vinylidene cyanide; etc. Homopolymers of the above compounds or copolymers or terpolymers thereof are beneficially modified by the present phosphonic anhydrides. Examples of such copolymers or terpolymers are those obtained by polymerization of the following monomer mixtures: vinyl chlorine-vinyl acetate, acrylonitrile-vinyl-pyridine, styrene-methyl methacrylate; styrene-N-vinyl-pyrrolidone, cyclohexyl methacrylate-vinyl chloroacetate, acrylonitrile-vinylidene cyanide, methyl methacrylate-vinyl acetate, ethyl acrylate-methacrylamide-ethyl chloroacrylate, vinyl chloride-vinylidene chloride-vinyl acetate, etc.

Other presently employed polymers of compounds having the ethylenic group, $>C=C<$, are the homopolymers, copolymers and terpolymers of the α,β-olefinic dicarboxylic acids and the derivatives thereof such as the anhydrides, esters, amides, nitriles and imides, e.g., methyl, butyl, 2-ethylhexyl or dodecyl fumarate or maleate, maleic, chloromaleic, citraconic or itaconic anhydride, fumaronitrile, dichlorofumaronitrile or citraconitrile, fumaramide, or maleamide; maleimide or N-phenylmale-imide, etc. Examples of particularly useful copolymers and terpolymers prepared from the α,β-olefinic dicarboxy compounds are the copolymers of maleic anhydride and a vinyl compound such as ethylene, propylene, isobutylene, styrene, α-methylstyrene, vinyl acetate, vinyl propionate, methyl isopropenyl ketone, isobutyl vinyl ether, etc., the copolymers of dialkyl fumarate such as ethyl or butyl fumarate and a vinyl compound such as styrene, vinyl acetate, vinylidene chloride, ethyl methacrylate, acrylontrile, etc.

Readily and advantageously modified by the present phosphonic anhydrides are also the polymers and copolymers of unsaturated, cyclic esters of carbonic acid, e.g., homopolymeric vinylene carbonate or the copolymers of vinylene carbonate with ethylenic compounds such as ethylene, vinyl chloride, vinyl acetate, 1,3-butadiene, acrylonitrile, methacrylonitrile, or the esters of methacrylic or acrylic acid.

Readily and advantageously modified by the present phosphonic anhydrides are also the polyarylcarbonate polymers such as the linear polyarylcarbonates formed from diphenols or diphydroxy aromatic compounds including single and fused-ring nuclei with two hydroxy groups as well as monohydroxy-substituted aromatic residues joined in parts by various connecting linkages. Examples of the foregoing include dihydroxy benzenes, naphthalenes and the like, the dihydroxydiphenyl ethers, sulfones, alkanes [bis(4-hydroxyphenyl)2,2-propane], ketones and the like.

Advantageously modified by the present phosphonic anhydrides are also polymers, copolymers or terpolymers or polymerizable compounds having a plurality of double bonds, e.g., a rubbery, conjugated diene polymerizate such as homopolymerized 2,3-butadiene, 2-chlorobutadiene or isoprene and linear copolymers or terpolymers such as butadiene-acrylonitrile copolymer, isobutylene-butadiene copolymer (butyl rubber) butadiene-styrene copolymer of 2-chloro-butadiene-vinylidene cyanide-acrylonitrile terpolymer; esters of saturated di- or polyhydroxy compounds with olefinic carboxylic acids such as ethylene glycol dimethacrylate, triethylene glycol dicrotonate or glyceryl triacrylate; esters of olefinic alcohols with dicarboxylic acids or with olefinic monocarboxylic acids such as diallyl adipate, divinyl succinate, diallyl fumarate, allyl methacrylate or crotyl acrylate and other diethylenically unsaturated compounds such as diallyl carbonate, divinyl ether or divinylbenzene, as well as the cross-linked polymeric materials such as methyl methacrylate-diallyl methacrylate copolymer or butadiene-styrene-divinyl-benzene terpolymer.

Polymerized materials prepared by subsequent reaction of the preformed vinyl polymers, e.g., polyvinyl alcohol, the polyvinyl acetals such as polyvinyl formal or polyvinyl butyral, or completely or partially hydrolyzed polyacrylonitrile are likewise modified in properties by the present phosphonic anhydrides to give polymeric materials of enhanced utility.

Polymeric materials with which the present phosphonic anhydrides can be employed as adjuvants are also polymers which contain elements such as sulfur, phosphorus, boron or silicon, e.g., the sulfides, sulfones, sulfoxides, sulfites, sulfates and sulfonates such as the polymers and copolymers of vinyl sulfide, vinyl sulfone, 2-propenyl sulfoxide, ethylene sulfonic acid and its salts, esters and amides, and sulfonated polystyrene; the olefin-sulfur dioxide polymers, the phosphines, phosphites, phosphates and phosphonates such as diphenylvinylphosphine, allyl phosphite and methallyl phosphite, ethylene phosphonic acid and styrenephosphonic acids and their salts, esters and amides; the silanes such as dimethylvinylsilane, diphenylvinylsilane and methlphenylvinylsilane, etc.

A class of synthetic polymeric materials with which the present phosphonic anhydrides are very useful comprises the cellulose derivatives, e.g., the cellulose esters such as cellulose acetate, cellulose triacetate, or cellulose acetate butyrate, the cellulose ethers such as methyl or ethyl cellulose, cellulose nitrate, carboxymethyl cellulose, cellophane, rayon, regenerated rayon, etc. The phosphonic anhydrides may be incorporated into films of such cellulose derivatives by adding them to the solutions from which the films are cast or into the melts from which the fibers are extruded.

The present phosphonic anhydrides are particularly suited to the modification of liquid resin compositions of the polyester type, e.g., the linear polyesters which are obtained by the reaction of one or more polyhydric alcohols with one or more α, β-unsaturated polycarboxylic acids alone or in combination with one or more saturated polycarboxylic acid compounds, or the cross-linked polyester resins which are obtained by reacting the linear polyester with a compound containing a $CH_2=C<$ group.

The cross-linking component of the presently modified polyester resin may be, e.g., styrene, the nuclear or side-chained substituted styrenes such as 3,4-dichlorostyrene, α-chloro-styrene, α-methylstyrene; other vinyl-substituted hydrocarbons such as α- or β-vinylnaphthalene or 4-vinylbiphenyl; the olefinic carboxylic acids and the esters, nitriles, amides and anhydrides thereof such as acrylic acid, methacrylic acid, ethyl acrylate, or acrylonitrile; the vinyl esters such as vinyl acetate or vinyl chloroacetate; the olefinic ketones such as ethyl vinyl ketone and isopropenyl methyl ketones; the alkenes such as isobutylene and 2-pentene; the olefinic ethers such as vinyl ethyl ether and vinyl isobutyl ether; etc.

The epoxy resins are another class of polymeric materials with which the present phosphonic anhydrides are compatible and are advantageously used. These resins are condensation products formed by the reaction of a polyhydroxy compound and epichlorohydrin, which condensation products are subsequently cured by addition of cross-linking agents. The hydroxy compound may be e.g., ethylene glycol, 4,4'-isopropylidenediphenol, etc. The cross-linking agent employed in the curing or hardening step may be a dicarboxylic compound such as phthalic anhydride or adipic acid, but is more generally a polyamine such as ethylene diamine, m- or p-phenylene diamine or diethylenetriamine.

The polyurethanes comprise another class of polymeric materials which are beneficially modified by the present phosphonic anhydrides. The polyurethanes, like the above-mentioned polyesters, are commercial materials which are employed in structural applications, e.g., as insulating foams, in the manufacture of textile fibers, as resin bases in the manufacture of curable coating compositions and as impregnating adhesives in the fabrication of laminates of woods and other fibrous materials. Essentially the polyurethanes are condensation products of a diisocyanate and a compound having a molecular weight of at least 500 and preferably about 1500–5000, and at least two reactive hydrogen atoms, i.e., hydrogen atoms determinable by the Zerewitinoff method. The useful active-hydrogen containing compounds may be polyesters prepared from polycarboxylic acids and polyhydric alcohols, polyhydric polyalkylene ethers having at least 2 hydroxy groups, polythioether glycols, polyesteramides, etc.

The polyesters or polyesteramides used for the production of the polyurethane may be branched and/or linear, e.g., the esters of adipic, sebacic, 6-aminocaproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, etc., with polyalcohols such as ethylene glycol, diethylene glycol, pentaglycol, glycerol, sorbitol, triethanolamine, di-(β-hydroxyethyl)ether, etc. and/or amino-alcohols such as ethanolamine, 3-aminopropanol, 4-amino-propanol, 5-aminopentanol-1, 6-aminohexanol, 10-aminodecanol, 6-amino-5-methylhexanol-1, p-hydroxymethylbenzylamine, etc.; and with mixtures of the above polyalcohols and amines, ethylene diamine, hexamethylene diamine, 3-methylhexamethylene diamine, decamethylene diamine and m-phenylenediamine, etc. and/or amino-alcohols, etc. In the esterification, the acid per se may be used for condensation or, where desirable, equivalent components such as the acid halide or anhydride may be used.

The alkylene glycols and polyoxyalkylene or polythioalkylene glycols used for the production of the polyurethanes may comprise ethylene glycol, propylene glycol, butylene glycol-2,3, butylene glycol-1,3,2-methylpentane-diol-2,4,2-ethylhexane-diol-1,3, hexamethylene glycol, styrene glycol and decamethylene glycol, etc., and diethylene glycol, triethylene glycol, tetraethylene glycol, polythioethylene glycol, polyethylene glycols 200, 400 and 600 etc., dipropylene glycol, tripropylene glycol, trithiopropylene glycol, polypropylene glycols 400, 750, 1,200 and 2,000 etc.

Broadly, any of the polyesters, polyisocyanate-modified polyesters, polyesteramides, polyisocyanate-modified polyesteramides, alkylene glycols, polyisocyanate-modified alkylene glycols polyoxyalkylene glycols and polyisocyanate-modified polyoxyalkylene glycols, etc. having free reactive hydrogen atoms, free reactive carboxylic and/or especially hydroxyl groups may be employed for the production of the polyurethanes. Moreover, any organic compound containing at least two radicals selected from the class consisting of hydroxyl and carboxyl groups may be employed.

The organic polyisocyanates useful for the production of the polyurethanes include ethylene diisocyanate, ethylidene diisocyanate, propylene-1,2-diisocyanate, butylene-1,3-diisocyanate, hexylene-1,6-diisocyanate, cyclohexylene-1,2 - diisocyanate, m - phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenyl diisocyanate, triphenylamine triisocyanate, 1,5-naphthalene diisocyanate or polyisocyanates in a blocked or inactive form such as the bisphenyl carbamates of toluylene diisocyanate, p,p'-diphenylmethane diisocyanate, p-phenylene diisocyanate and 1,5-naphthalene diisocyanate, etc.

For preparation of the flame-retardant polyurethanes, the present phosphonic anhydrides are preferably added to a mixture of the reactants and catalyst before hardening. The hardened molded pieces or forms are rendered flame-retardant by the inclusion therein of the phosphonic anhydride in quantities of from about 2% to 25% by weight of the polyurethane. Use of the present phosphonic anhydrides in the polyurethane foams can also, in some applications, improve the mechanical properties of the foams.

Phenolic resins are also beneficially modified by the present phosphonic anhydrides, which compounds can be incorporated into the resins either by milling in molding applications or by addition to film-forming or impregnating and bonding solutions previous to casting. Phenolic resins with which the present compounds are employed are, for example, the phenolaldehyde resins prepared from phenols such as phenol, cresol, xylenol, resorcinol, 4-butylphenol, 4-phenylphenol, and aldehydes such as formaldehyde, acetaldehyde, or butyraldehyde in the presence of either acidic or basic catalysts, depending upon whether the resin is intended for use as a molding or extruding resin or as the resin base in coating and impregnating compositions.

The aminoplasts comprise another group of aldehyde resins which are beneficially modified by the present phosphonic anhydrides. Examples thereof are the heat-convertible condensation products of an aldehyde with urea, thiourea, guanidine, cyanamide, dicyandiamide, alkyl or aryl guanamines, and the triazines such as melamine, 2-chloro-4,6-diamino-1,3,5-triazine and 2-hydroxy-4,6-diamino-1,3,5-triazines. The present adjuvants are compatible with the aminoplasts; and depending upon the quantity of phosphonic anhydride used, they serve to modify their physical properties as well as to render them fire-retardant. When the aminoplasts are destined for use as impregnating agents, bonding adhesives, coatings and casting of films, the phosphonic anhydrides are incorporated into solutions or suspensions in which the aminoplast is carried. The resulting mixtures give strong, fire-retardant laminates when sheets of paper, glass, cloth or fabric are impregnated therewith and cured.

Also beneficially modified by the present phosphonic anhydrides are the nylons, i.e., the superpolyamides which are generally obtained by the condensation of a diamine, e.g., hexamethylenediamine with a dicarboxylic acid, e.g., adipic acid. Depending upon the quantity of phosphonic anhydride employed and the individual nature of the compound, there are obtained flame-retardant and/or dye receptor effects.

Other polyamides with which the present phosphonic anhydrides are beneficially employed, e.g., for improvement in reduced burning rates, are the polypeptides which may be prepared, e.g., by reaction of N-carbobenzyl oxyglycin with glycine or a mixture of glycine and lysine, or an N-carboxy amino acid anhydride such as N-carboxy-DL-phenyl-alanine anhydride; the polymeric lactams, e.g., polycaprolactam, piperidone, 2-oxohexamethyleneimine and other cyclic amides. The present phosphonic anhydrides can be incorporated into molding or extruding compositions for flame-retardant effect and/or to modify the physical properties of such compositions.

The present phosphonic anhydrides are also advantageously employed as adjuvants for polymeric aldehydes, e.g., homopolymeric, high-molecular weight formaldehyde.

The present phosphonic anhydrides are also adjuvants for linear polymers obtained by the self-condensation of bifunctional compounds generally, e.g., the polyethers which are derived by the self-condensation of dihydric alcohols such as ethylene glycol, propylene glycol or hexamethylene glycol; the polyesters which are obtained by the self-condensation of hydroxy acids such as lactic acid or 4-hydroxybutyric acid, the polyamides which are prepared by the self-condensation of amino carboxylic acids such as 4-aminobutyric acid or 6-aminocaproic acid; the polyanhydrides which are formed by the self-condensation of dicarboxylic acids such as sebacic acid or adipic acid, etc. The present phosphonic anhydrides are flame-retardants for such self-condensation products, generally; and where transparentizing effect and dye receptivity are lacking, the phosphonic anhydrides are often instrumental in ameliorating such deficiencies.

The following examples are presented to illustrate the invention, with parts and percentages by weight being used in the examples unless otherwise indicated. All polymeric compositions illustrated in the following examples will exhibit reduced burning rates and can be classified as either non-burning or self-extinguishing.

Example I

A copolymeric composition is obtained by heating about 0.15 mole of ethylene diamine and about 0.5 mol of amino tri(methylenephosphonic anhydride) in benzene to about 80° C. for about 4 hours. The reaction batch is cooled to room temperature and the benzene distilled off yielding a polymeric composition which softens at about 250–280° C.

Example II

A copolymeric composition is also obtained by blending about 0.3 mol of hexamethylene diamine and about 0.1 mol of an indicated phosphonic anhydride compound, and heating the mixture for 3 hours at about 150° C. and thereafter cooling to room temperature. The added phosphonic anhydride compounds are:

(1) Amino tri(methylenephosphonic anhydride)
(2) Anhydride of dodecyl amino di(methylenephosphonic acid)
(3) Anhydride of tetradecyl amino di(methylenephosphonic acid)
(4) Anhydride of ethylene diamine tetra(methylenephosphonic acid)
(5) Anhydride of hexamethylene diamine tetra(methylenephosphonic acid).

Example III

A copolymeric composition is also obtained by blending about 0.3 mol of ethylene glycol and about 0.1 mol of indicated phosphonic anhydride compound and then heating the mixture at 90° C. for about 1 hour. Upon cooling to room temperature the composition sets to a solid polymeric composition. The added phosphonic anhydride compounds are:

(1) Amino tri(methylenephosphonic anhydride)
(2) Anhydride of dodecyl amino di(methylenephosphonic acid)
(3) Anhydride of tetradecyl amino di(methylenephosphonic acid)
(4) Anhydride of ethylene diamine tetra(methylenephosphonic acid)
(5) Anhydride of hexamethylene diamine tetra(methylenephosphonic acid)

Example IV

A copolymeric composition is obtained by dissolving about 4.7 parts of amino tri(methylenephosphonic anhydride) in about 110 parts of dimethyl formamide at a reflux temperature of about 125° C., and adding about 3.5 parts of hexamethylene diamine to the solution under refluxing. The polymeric composition precipitates from the solution in the form of a solid material and after cooling to room temperature is removed from the dimethyl formamide solution.

Example V

A polymeric composition is obtained by blending 41 parts of oleic acid, 21 parts of glycerine, 17 parts of an indicated phosphonic anhydride compound, and a trace of toluene sulfonic acid and heating the mixture to about 140° C. under a flowing nitrogen blanket sufficient to exclude air and to remove by-product water. After about 30 minutes gelatin occurs and the batch is cooled to room temperature to yield a solid polymeric composition. The added phosphonic anhydride compounds are:

(1) Amino tri(methylenephosphonic anhydride)
(2) Anhydride of dodecyl amino di(methylenephosphonic acid)
(3) Anhydride of hexamethylene diamine tetra(methylenephosphonic acid)

Example VI

This example illustrates the preparation of a rigid polyurethane foam using one of the indicated phosphonic anhydrides therein as the flame-retardant.

Ingredient:                                             Parts
    Methyl glucoside based polyol _____  100.0
    Trichloromonofluoromethane _____   35.0
    "Silicone Y-4316"[1] _____    2.0
    Tetramethylbutane diamine _____    1.5
    Phosphonic Anhydride[2] _____   10.0
    Polyisocyanate "Mondur MR"[3] _____  108.0

[1] "Silicone Y-4316"—is a trademark name for a silicon foam stabilizer sold by Union Carbide.
[2] Phosphonic anhydride:
(1) amino tri(methylenephosphonic anhydride)
(2) anhydride of tetra decyl amino di(methylenephosphonic acid)
(3) anhydride of hexamethylene diamine tetra(methylenephosphonic acid).
[3] Polyisocyanate "Mondur MR"—a polymethylene polyphenylisocyanate having an available NCO content of about 32% and a viscosity at 25° C. of 200±50 cps.

For the above formulation, all of the components except the polyisocyanate are blended to a homogeneous mixture, and then the polyisocyanate is added, the mixture blended thoroughly, and then is allowed to polymerize and rise.

Example VII

A composition is also obtained by adding one of the indicated phosphonic anhydride compounds in an amount sufficient to be about 10% by weight based on the weight of the total solids content of a 10% benzene solution of a 72:28 molar ratio styrene-acrylonitrile copolymer. The benzene is distilled off yielding a polymeric composition. The added phosphonic anhydride compounds are:

(1) Amino tri(methylenephosphonic anhydride)
(2) Anhydride of phenyl amino di(methylenephosphonic acid)
(3) Anhydride of cyclohexyl amino di(methylenephosphonic acid).

Example VIII

To a polymer blend of an unsaturated polyester prepared by condensing one mol of an indicated phosphonic anhydride, ½ mol of maleic anhydride, ½ mol of phthalic anhydride and 2.1 mols of propylene glycol to an acid number of about 40 at 200° C., cooling the mixture and dissolving the mixture in a sufficient amount of styrene monomer so that the resulting mixture comprises 30 parts styrene monomer to 70 parts of polyesters. There is added a small amount (3% w./w.) of benzoyl peroxide and the resulting mixture is polymerized at 80° C. yielding a thermosetting resin. The added phosphonic anhydride compounds are:

(1) Amino tri(methylenephosphonic anhydride)
(2) Anhydride of dodecylphenyl amino di(methylenephosphonic acid)
(3) Anhydride of trimethylene diamine tetra(methylenephosphonic acid).

Example IX

To a granular blend of a polystyrene and butadiene-styrene copolymer containing about 6% by weight of the copolymer there is added one of the indicated phosphonic anhydride compounds in an amount of about 4% by weight by blending for 15 minutes in a tumbling type laboratory blender and then extruding the blend into rods. The added phosphonic anhydride compounds are:

(1) Amino tri(methylenephosphonic anhydride)
(2) Anhydride of methyl amino di(methylenephosphonic acid).

Example X

To melted samples of a natural high molecular weight low density polyethylene having a density of about 0.9, a melt index of about 0.3 gm./10 min., a softening temperature of about 105° C., and a tensile strength (ultimate) of 2300 p.s.i.g., various amounts of one of the indicated phosphonic anhydrides sufficient to make compositions wherein the added anhydride comprises from about 4 to 8% of the total weight of the composition are added. The samples are cooled to room temperature to provide polymer compositions. The added phosphonic anhydride compounds are:

(1) Amino tri(methylenephosphonic anhydride)
(2) Anhydride of hexylamino di(methylenephosphonic acid)
(3) Anhydride of ethylene triamine penta(methylenephosphonic acid)

Example XI

To a 5% solution of a polyvinyl formal in ethylene dichloride there is added one of the indicated phosphonic anhydride compounds in a quantity which is about 20% by weight of the total solids content of the solution. Films are cast from such solutions and then air dried for about 24 hours. The added phosphonic compounds are:

(1) Amino tri(methylenephosphonic anhydride)
(2) Anhydride of triethylene tetraamine hexa(methylenephosphonic acid)

Example XII

Improved films are also obtained when one of the indicated phosphonic anhydride compounds is added to a 10% solution of a 50:50 molar ratio styrene-methyl methacrylate copolymer in benzene in an amount sufficient to be about 30% by weight of the total solids content and then cast into films which are flexible. The added phosphonic anhydride compounds are:

(1) Amino tri(methylenephosphonic anhydride)
(2) Anhydride of butyl amino di(methylenephosphonic acid)

Example XIII

With about 3 parts of a commercially available condensation product of linoleic acid and a polyamine having an amine value of from 290–320 and a viscosity of 80–120 poises at 40° C., there is mixed 7 parts of diglycidyl ether of Bisphenol A and a sufficient amount of one of the indicated phosphonic anhydrides to make a composition having about 16% by weight, based on the weight of the total composition, of the phosponic anhydride. The resulting reaction mixture is poured into a small aluminum pan (coated with a silicone grease to prevent sticking) and heated in an oven at 100° C. for about 2 hours. After cooling to room temperature an epoxy resinous product is obtained. The added phosphonic anhydride compounds are:

(1) Amino tri(methylenephosphonic anhydride)
(2) Anhydride of dodecyl amino di(methylenephosphonic acid)
(3) Anhydride of amino tri(ethylidenephosphonic acid)

Example XIV

To samples of a commercial cellulose acetate butyrate having an average acyl content of 13% and 37% butyryl and a viscosity range of 17–33 seconds (64–124 poises) as determined by ASTM method D–1343–54T in the solution described in Formula A, ASTM method D–871–54T are blended on hot mill rolls a sufficient amount of one of the indicated phosphonic anhydrides such that the final compostions contain from about 10 to 15% by weight of the added phosphonic anhydrides. After blending the samples are cooled to room temperature to obtain a polymeric compoistion. The added phosphonic anhydrides are:

(1) Amino tri(methylenephosphonic anhydride)
(2) Anhydride of hexydecyl amino di(methylenephosphonic acid)
(3) Anhydride of phenylethyl amino di(methylenephosphonic acid).

Example XV

To a 10% ethylene dichloride solution of polyvinyl acetate there is added one of the indicated phosphonic anhydride compounds in a quantity which is ½ by weight to that of the polyvinyl acetate present in the solution. Films cast from the resulting mixture are flexible. The added phosphonic anhydride compounds are:

(1) Amino tri(methylenephosphonic anhydride)
(2) Anhydride of octyl amino di(methylenephosphonic acid)
(3) Anhydride of ethylene diamine tetra(methylenephosphonic acid)

Example XVI

To melted samples of a commercial rigid polymethyl methacrylate polymer there is blended on hot mill rolls one of the indicated phosphonic anhydrides in an amount sufficient to provide about 20% of the anhydride per total weight of the composition. The samples are milled into sheets in order to obtain polymeric compositions. The added phosphonic anhydrides are:

(1) Amino tri(methylenephosphonic anhydride)
(2) Anhydride of oleyl amino di(methylenephosphonic acid)
(3) Anhydride of hexamethylene diamine tetra(methylenephosphonic acid).

Example XVII

To 100 parts of a polyvinyl chloride resin there is added 50 parts of dioctyl phthalate and 50 parts of amino tri(methylenephosphonic anhydride). The mixture is placed on hot mill rolls and blended. When thoroughly blended, the product is stripped from the rolls and pressed into square shaped pieces which are soft pliable plastic.

Example XVIII

A salt is prepared from hexamethylene diamine and adipic acid by mixing about 44 parts of amine with about 150 parts of the acid in the presence of 1300 parts of 95% ethyl alcohol and 210 parts of water. The mass is warmed until complete solution occurs and then cooled to obtain crystals of hexamethylene diammonium adipate. To this salt is added about 16 parts of amino tri(methylene phosphonic anhydride) and the mixture heated for about three hours with an equal weight of mixed xylenols (B.P. 218–222° C.) and the entire reaction mass is then poured gradually with stirring into a large volume of ethyl alcohol. The modified polyamide precipitates as a granular powder and is filtered, washed with alcohol and dried.

What is claimed is:

1. An organic composition comprising an organic synthetic polymer and at least a fire resistance imparting amount of an anhydride of an organo-amino-polyphosphonic acid having the formula:

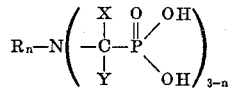

wherein $n$ is an integer 0 to 1, X and Y are selected from the group consisting of hydrogen and alkyl groups containing from 1 to 6 carbon atoms and R is selected from the group consisting of hydrogen, aliphatic, aryl, alkaryl, aralkyl, alicyclic, and

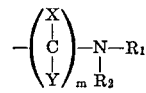

$m$ is an integer from 1 to 10, $R_1$ and $R_2$ are each selected from the group consisting of hydrogen, alkyl groups containing from 1 to 6 carbon atoms,

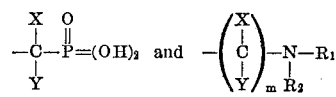

said anhydride characterized by exhibiting an infra-red absorption spectrum characteristic of a phosphonic anhydride and an increase in the melting point over the corresponding organo-amino-polyphosphonic acid.

2. A composition according to claim 1, wherein said anhydride is an anhydride of an amino tri(lower alkylidenephosphonic acid) having the formula:

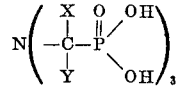

wherein X and Y are selected from the group consisting of hydrogen and alkyl groups containing from 1 to 6 carbon atoms.

3. A composition according to claim 2, wherein said anhydride has the formula $N(CH_2)_3P_3O_6$.

4. A composition according to claim 1, wherein said anhydride is an anhydride of an alkyl amino di(lower alkylidenephosphonic acid) having the formula:

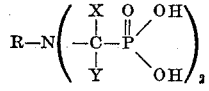

wherein X and Y are selected from the group consisting of hydrogen and alkyl groups containing from 1 to 6 carbon atoms and R is an alkyl group containing from 1 to 20 carbon atoms.

5. A composition according to claim 1, wherein said anhydride is an anhydride of an alkylene diamine tetra(methylenephosphonic acid) having the formula:

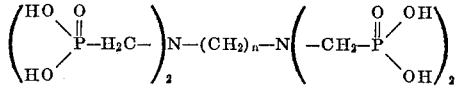

wherein $n$ is an integer from 1 to 10 inclusive.

6. A composition according to claim 3, wherein said polymer is a polyurethane.

7. A composition according to claim 3, wherein said polymer is a polyester polymer.

8. A composition according to claim 3, wherein said polymer is a polyamide.

9. A composition according to claim 3, wherein said polymer is polystyrene.

(References on following page)

References Cited

UNITED STATES PATENTS

| | | | |
|---|---|---|---|
| 2,374,807 | 5/1945 | Dickey et al. | 260—502.5 |
| 2,599,807 | 6/1952 | Bersworth | 260—502.5 |
| 2,635,112 | 4/1953 | Fields | 260—502.5 |
| 2,841,611 | 7/1958 | Bersworth | 260—502.5 |
| 2,993,067 | 7/1961 | Magerlein et al. | 260—502.5 |
| 3,121,697 | 2/1964 | Girard et al. | 260—45.9 |
| 3,234,140 | 2/1966 | Irani | 260—502.5 |

DONALD E. CZAJA, *Primary Examiner.*

H. E. TAYLOR, *Assistant Examiner.*